(12) United States Patent
Ballard (10) Patent No.: US 9,467,441 B2
(45) Date of Patent: Oct. 11, 2016

(54) SECURE SERVICE DELEGATOR (71) Applicant: Dell Products, L.P., Round Rock, TX (US)

(72) Inventor: Lee E. Ballard, Cedar Park, TX (US)

(73) Assignee: DELL PRODUCTS, L.P., Round Rock, TX (US)

(*) Notice: Subject to any disclaimer, the term of this patent is extended or adjusted under 35 U.S.C. 154(b) by 124 days.

(21) Appl. No.: 14/189,991

(22) Filed: Feb. 25, 2014

(65) Prior Publication Data

US 2015/0244708 A1    Aug. 27, 2015

(51) Int. Cl.
*G06F 7/04* (2006.01)
*G06F 15/16* (2006.01)
*G06F 17/30* (2006.01)
*H04L 29/06* (2006.01)
*G06Q 10/10* (2012.01)
*G06Q 30/00* (2012.01)

(52) U.S. Cl.
CPC ............ *H04L 63/0823* (2013.01); *G06Q 10/10* (2013.01); *G06Q 30/016* (2013.01)

(58) Field of Classification Search
CPC .................................................. H04L 63/0823
USPC ............................................................ 726/6
See application file for complete search history.

(56) References Cited

U.S. PATENT DOCUMENTS

| | | | |
|---|---|---|---|
| 7,913,084 B2* | 3/2011 | Medvinsky | H04L 63/0815 709/229 |
| 8,630,402 B1* | 1/2014 | Martinez et al. | 379/265.11 |
| 2003/0097319 A1* | 5/2003 | Moldovan | G06Q 40/00 705/35 |
| 2007/0101033 A1* | 5/2007 | Chen et al. | 710/241 |
| 2007/0174207 A1* | 7/2007 | Coulman et al. | 705/67 |
| 2008/0195796 A1* | 8/2008 | Wang et al. | 711/102 |
| 2008/0256349 A1* | 10/2008 | Dennis et al. | 713/1 |
| 2010/0100953 A1* | 4/2010 | Mowers | H04L 63/0807 726/10 |
| 2014/0026200 A1* | 1/2014 | Ekberg | H04L 9/3236 726/6 |
| 2014/0164776 A1* | 6/2014 | Hook | H04L 9/14 713/171 |
| 2014/0325035 A1* | 10/2014 | Ding et al. | 709/220 |

* cited by examiner

*Primary Examiner* — Morshed Mehedi
*Assistant Examiner* — Khalil Naghdali
(74) *Attorney, Agent, or Firm* — Fogarty, L.L.C.

(57) ABSTRACT

Systems and methods for a secure service delegator. In some embodiments, an Information Handling System (IHS) operated by a manufacturer of a client device provided to a customer enterprise may include a processor and a memory coupled to the processor. The memory may include program instructions stored thereon that, upon execution by the processor, cause the IHS to: receive, from the client device via a secure connection, a request to obtain a provisioning credential; identify a delegate provisioning server associated with the customer enterprise; and enable the client device to access the delegate provisioning server and to retrieve the provisioning credential from the delegate provisioning server.

14 Claims, 4 Drawing Sheets

SECURE SERVICE DELEGATOR

FIELD

This disclosure relates generally to computer systems, and more specifically, to systems and methods for providing a secure service delegator.

BACKGROUND

As the value and use of information continues to increase, individuals and businesses seek additional ways to process and store information. One option is an Information Handling System (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

In some situations, a customer (e.g., a business or an enterprise) may buy various IHS devices (e.g., smart phones, laptops, desktops, servers, etc.) that need to be configured for security or monitoring before they can be deployed or given to the customer's end-users (e.g., the customer's employees, the customer's own customers, etc.). To perform this initial configuration, a customer's IT department may receive each individual IHS device, unbox it, manually configure it, and then ship it to its end-user for deployment. Alternatively, the customer may request that the IHS device's manufacturer put a custom image on the IHS device, or the customer's end-users may themselves receive the IHS device and follow steps to re-image those devices on their own.

In cases where the manufacturer puts a custom image on the IHS device, those imaging operations are performed at the factory. However, when the IHS device is coming from the manufacturer's existing inventory, manipulating each individual IHS device is impractical. Conversely, having employees re-image their IHS devices tends to be problematic logistically and also for security reasons.

An existing approach for addressing the foregoing problems includes having the IHS device initiate a request to the customer's locally deployed provisioning service when the IHS device is first activated. In most cases, an IHS device can use a network connection to be activated out of the box. As the inventor hereof has recognized, however, there is currently no way to pre-provision trust of a customer's provisioning service only for IHS devices that the customer purchases.

SUMMARY

Embodiments of systems and methods for providing a secure service delegator are described herein. In an illustrative, non-limiting embodiment, an Information Handling System (IHS) operated by a manufacturer of a client device provided to a customer enterprise may include a processor and a memory coupled to the processor. The memory may include program instructions stored thereon that, upon execution by the processor, cause the IHS to: receive, from the client device via a secure connection, a request to obtain a provisioning credential; identify a delegate provisioning server associated with the customer enterprise; and enable the client device to access the delegate provisioning server and to retrieve the provisioning credential from the delegate provisioning server.

For example, the IHS may be a delegation server and the client device may be a smart phone, tablet, laptop, desktop, or server. In some implementations, the secure connection may be established based upon a certificate stored in the client device during manufacturing of the client device by the manufacturer. The provisioning certificate may be inaccessible to the customer enterprise. Also, the provisioning certificate may be stored in other client devices provided to other customer enterprises by the manufacturer.

The delegate provisioning server may be configured to service the client device based, at least in part, upon an identity of the client device. The identity may be represented by a service tag stored in the client device during manufacturing of the client device by the manufacturer. The program instructions may further cause the IHS to, prior to receiving the request, receive a registration of the client device from the customer enterprise via a registration portal. Moreover, to identify the delegate provisioning server associated with the customer enterprise, the program instructions may further cause the IHS to identify a domain of the customer enterprise based, at least in part, upon the request.

In another illustrative, non-limiting embodiment, a method may include transmitting, by a client device to a delegator server operated by a manufacturer of the client device, a request to obtain a credential, and receiving the credential from a delegate server operated by a customer of the manufacturer. For instance, the request may be transmitted by the client device as part of an activation procedure initiated by a user of the client device. In some cases, transmitting may include establishing a secure connection with the delegator server based upon a certificate stored within the end-used device during manufacturing of the client device, and the same certificate may be stored in other client devices provided to other customers.

The credential may include a password. Receiving the credential from the delegate server may occur in response to the delegator server identifying the customer based, at least in part, upon the request. The method may further include receiving, at the client device, a provisioning service from the delegate server.

In yet another illustrative, non-limiting embodiment, a non-transitory computer-readable medium may have program instructions stored thereon that, upon execution by an IHS operated by a customer entity of a manufacturing entity, cause the IHS to: receive an indication from a delegator server operated by the manufacturing entity that that a client device provided to the customer entity has requested an activation service; and provide the activation service to the client device. The IHS may be a delegate server operated by the customer entity.

The indication may be received in response to the delegator server having established a secure connection with the client device, the secure connection created based, at least in part, upon a certificate stored in the client device during manufacturing of the client device by the manufacturing entity, where the same certificate is stored in other end-used devices associated with other customer entities.

The activation service may be provided in response to the client device having obtained a provisioning credential from the delegator server, the provisioning credential obtained in response to the delegator server having identified the customer entity based, at least in part, upon a service tag associated with the client device, where the service tag is stored in the client device upon manufacturing of the client device by the manufacturing entity. In some cases, prior to the client device having obtained the provisioning credential, the manufacturing entity may receive a registration of the client device as belonging to the customer entity.

In some embodiments, one or more of the techniques described herein may be performed, at least in part, by an Information Handling System (IHS) operated by a given one of a plurality of participants of a virtual collaboration session. In other embodiments, these techniques may be performed by an IHS having a processor and a memory coupled to the processor, the memory including program instructions stored thereon that, upon execution by the processor, cause the IHS to execute one or more operations. In yet other embodiments, a non-transitory computer-readable medium may have program instructions stored thereon that, upon execution by an IHS, cause the IHS to execute one or more of the techniques described herein.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

In various embodiments, the systems and methods for providing a secure service delegator described herein may be implemented as part of an "auto-discovery" feature that enables the remote provisioning of client devices (e.g., smart phones, tablets, laptops, desktops, servers, etc.) out-of-the-box. As such, these systems and methods may be implemented without the need for an individual setup of every client device.

As used herein, the term "provisioning" refers to one or more operations used to prepare a client device with systems, data, and/or software, in order to make it ready for its intended operation. Examples of tasks carried up when provisioning a client device include, but are not limited to: loading software (e.g., operating system, device drivers, middleware, applications, etc.), customizing and configuring the system and the software to create or change a boot image for the device, change its parameters, such as IP address, IP Gateway to find associated network and storage resources, etc.

For example, in a non-limiting, illustrative scenario, certain techniques described herein may be used with the Integrated Dell® Remote Access Controller (iDRAC) service processor in a server to receive an Internet Protocol (IP) address of a trusted provisioning server. The received IP address may then be used to establish communication to receive a username and/or password (also referred to as "provisioning credentials" or simply "credentials"), which is generally the end goal of the auto-discovery process.

An alternative to auto-discovery is to set up a static IP address and user credentials at the server for every machine in the installation. An advantage of auto-discovery procedures, however, is the ability to set up a specified remote provisioning user account without being present at every server.

For instance, still referring to the foregoing example, when a Dell® PowerEdge server is ordered with the auto-discovery option enabled, the iDRAC within that server may be configured from the factory with Dynamic Host Configuration Protocol (DHCP) enabled and no default credentials for a remote login. Following the acquisition of a provisioning server address for the management console, the iDRAC may use the discovered address to initiate a Transport Layer Security (TLS) connection that receives a username and/or password (i.e., a "handshake"). After the process is complete, the credentials may then be used for subsequent configuration operations.

For certain types of client devices, customers may need the option to write their own business logic around the auto discovery process, but a client device manufacturer may not be in position to provide that because its auto-discovery process is not delegated. Traditionally, the manufacturer configures the trust of auto-discovery services in the factory the same way for all manufactured devices. Devices sold to different customers have the same trust relationships. For the custom auto-discovery process to work satisfactorily, it has to be trusted. However, if the process were trusted, it would be trusted by all devices sold to all customers, and not just devices sold to the particular customer wanting the custom solution. This would make such a solution less secure as a whole, because the manufacturer would lose control over what the devices that are manufactured trust.

In some situations, a manufacturer may be capable of loading customer certificates on a customer's devices at the factory to enable those devices to trust customer signed provisioning servers. However, this process is only viable for new servers. After a server leaves the factory the customer would have to manually load new certificates on their devices. Furthermore, if a client device is already part of the manufacturer's existing inventory, manipulating each individual device to load the customer's custom certificates is often impractical.

To address these, and other concerns, embodiments disclosed herein describe a delegator server maintained by the client device's manufacturer and configured to participate in an initial, secure communication with the client device based upon the global, shared certificate (e.g., a private key). After the initial communication, the delegator server may identify a delegate provisioning server, which is typically under control of the particular customer enterprise who ordered or purchased the client devices, and it may enable the client device to receive provisioning services from the delegate provisioning server in an automated fashion.

The delegator server may therefore be configured to bridge between a mutually authenticated SSL connection from a client device and a customer's custom provisioning server logic. The customer's custom provisioning logic may run on the delegator server, or the delegator may be configured to make a call back to the customer's delegate server. The delegator server may also enforce policies (such as time limits, client limits, etc.). In some cases, the use of this the delegator server by a customer may be a billable service for the client device's manufacturer.

Figure 1:
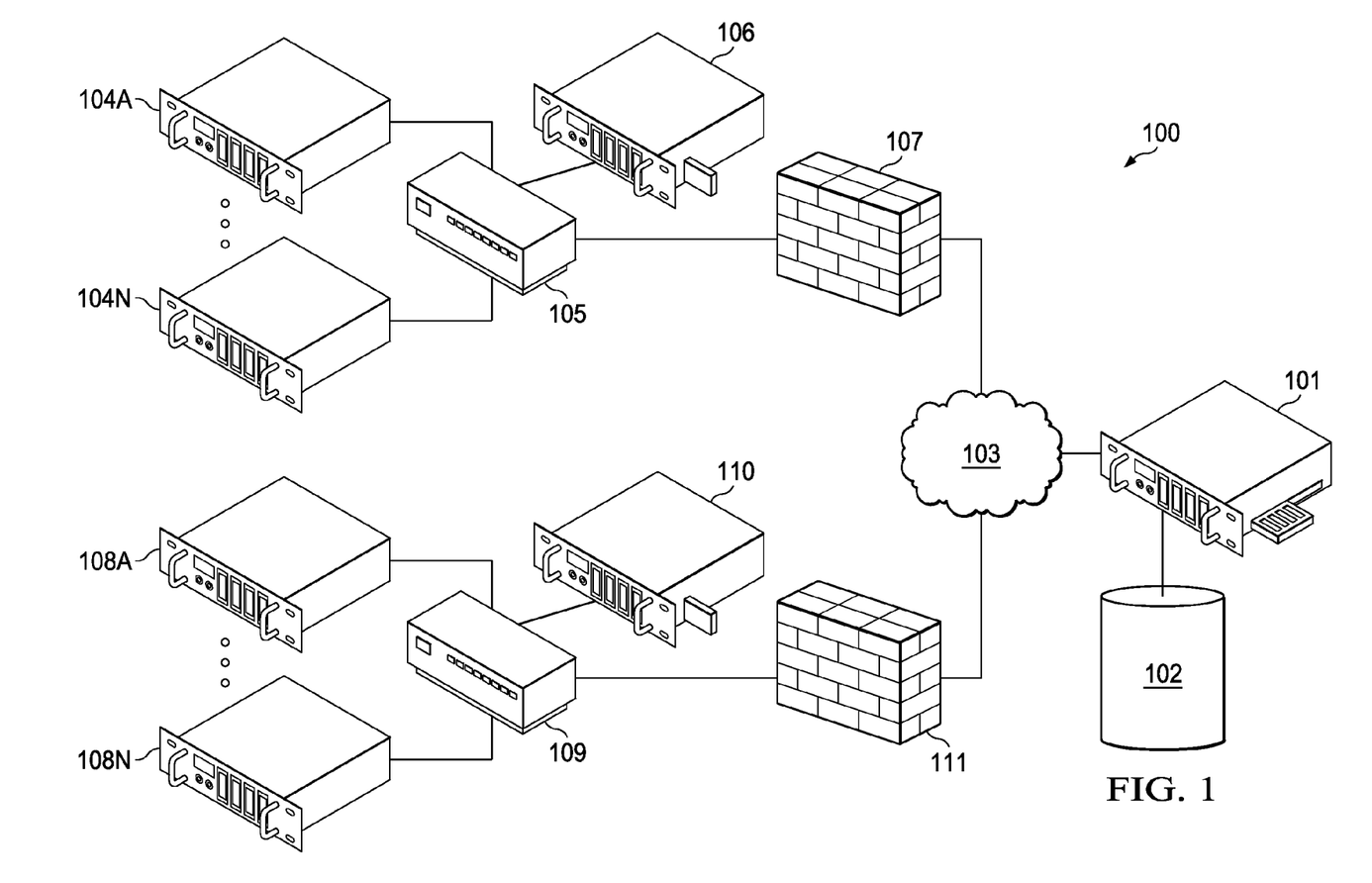
FIG. 1 is a diagram illustrating an example of an environment where systems and methods for providing a secure service delegator may be implemented according to some embodiments.

Turning no to FIG. 1, a diagram illustrating an example of environment 100 where systems and methods for providing a secure service delegator may be implemented is depicted. As shown, delegator server 101 is coupled to routing and policy database 102. In various embodiments, delegator server 101 and database 102 may be operated or otherwise controlled by a manufacturing entity. Client devices 104A-N have been manufactured by the manufacturing entity and provided or sold to a first customer enterprise. The first customer enterprise allows client devices 104A-N to communicate with other devices via network 103 using router, switch, or gateway 105 and firewall 107. The first customer enterprise may also operate or otherwise control first customer delegate server 106 coupled to network 103 via router, switch, or gateway 105 and/or firewall 107.

Client devices 108A-N have also been manufactured by the manufacturing entity and provided or sold to a second customer enterprise distinct from the first. The second customer enterprise allows client devices 108A-N to communicate with network 103 using router, switch, or gateway 109 and firewall 111. The second customer enterprise may further operate or otherwise control second customer delegate server 110, which is also coupled to network 103 via router, switch, or gateway 110 and/or firewall 111.

Generally speaking, network 103 may include a Public Switched Telephone Network (PSTN), one or more cellular networks (e.g., third generation (3G), fourth generation (4G), Long Term Evolution (LTE) wireless networks, etc.), satellite networks, computer or data networks (e.g., wireless networks, Wide Area Networks (WANs), metropolitan area networks (MANs), Local Area Networks (LANs), Virtual Private Networks (VPN), the Internet, etc.), or the like. In some cases, network 103 may include the Internet.

Servers 104A-N and 108A-N may be client devices purchased by respective customer enterprises and each device may be configured to initiate an auto-discovery procedure upon power up or triggered by some other configurable event. Furthermore, in some cases, each of client devices 104A-N and 108A-N may have been shipped to its respective customer enterprise with the same private key or certificate provided by the manufacturing entity. Rather than rely upon a common provision server made available by the manufacturing entity, however, devices 104A-N may receive provisioning services from first customer delegate server 106 and devices 108A-N may receive distinct provisioning services from second customer delegate server 110. In other words, the first and second customers may each be able to customize their respective provisioning services by employing their own delegate servers 106 and 110, respectively. It should be noted, however, that in some situations a delegate server (such as customer delegate server 106 and/or 110) may also be hosted by delegator server 101.

Routing and policy database 102 may be configured with rules and/or data that allow delegator server 101 to identify the first customer, for example, when client devices 104A-N issue a provisioning request to delegator server 101. Database 102 may also include rules and/or data that allow delegator server to identify delegate servers 106 and 110, and that enable delegator server 101 to provide information to client devices 104A-N or 108A-N sufficient to allow client devices 104A-N or 108A-N to establish connections with their respective delegate servers 106 and 110.

Figure 2A:
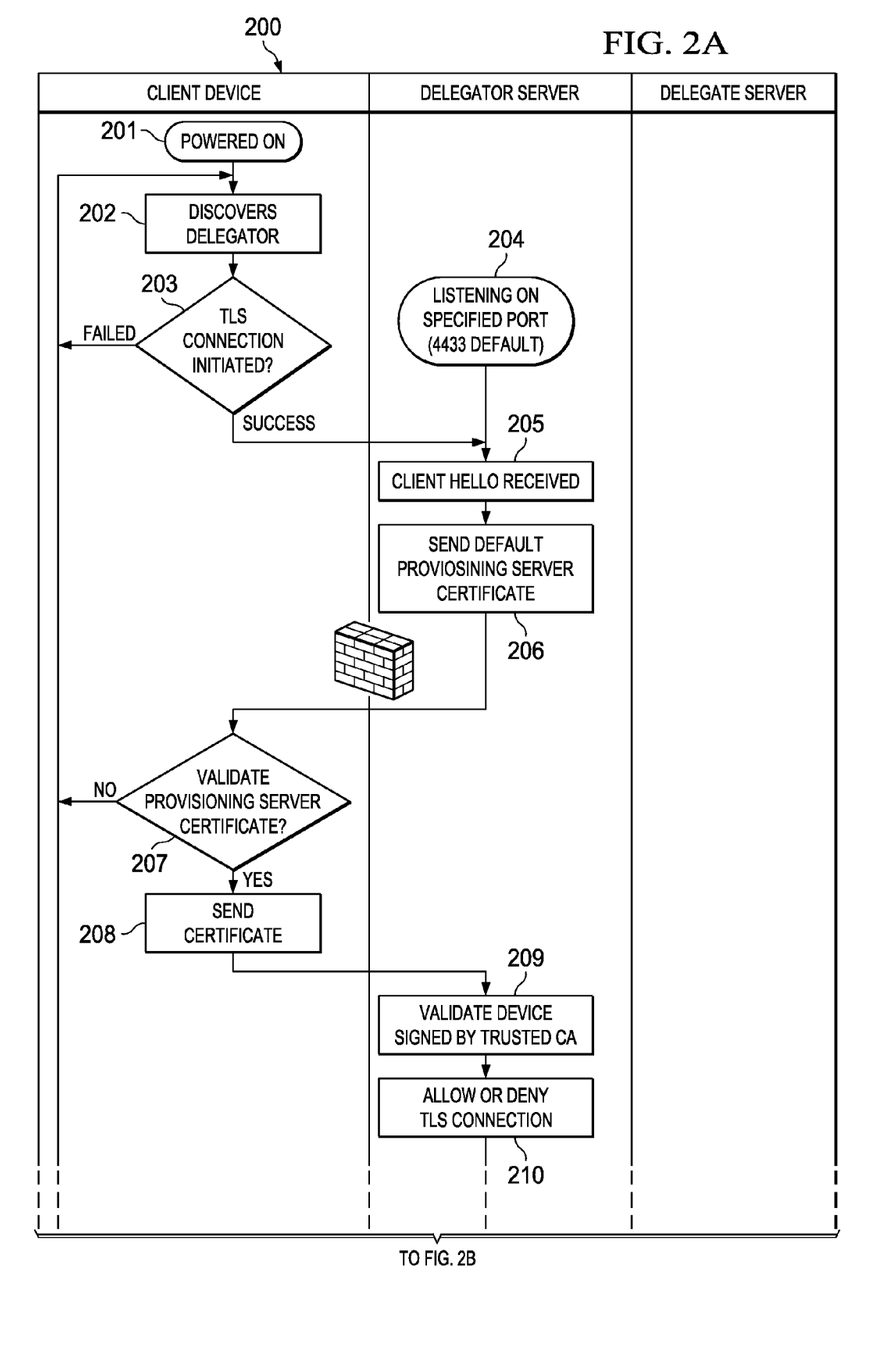
FIGS. 2A and 2B show a flowchart of a method for providing a secure service delegator according to some embodiments.
Figure 2B:
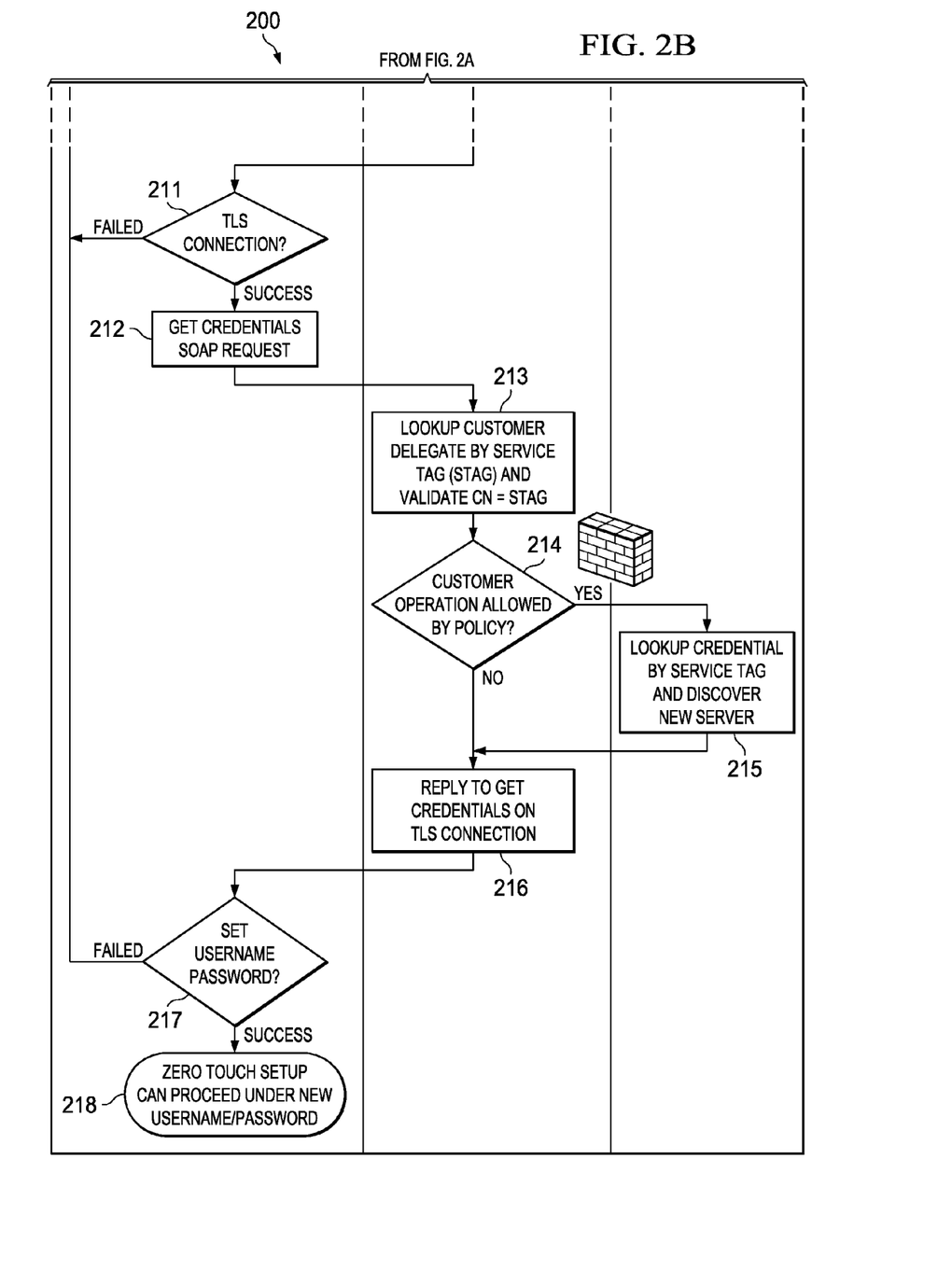

FIGS. 2A and 2B show a flowchart of method 200 for providing a secure service delegator. In some embodiments, operations 201-203, 207-212, 217, and 218 may be performed by a given one of client devices 104A-N or 108A-N. Operations 204-206, 209, 210, 213, 214, and 216 may be performed by delegator server 101, and operation 215 may be performed by a corresponding one of customer delegate servers 106 or 110.

At block 201, a client device (e.g., device 104A) is powered on. At block 202, the client device discovers the need to communicate with delegator server 101 to obtain provisioning credentials. Thus, at block 203, the client device initiates a Transport Layer Security (TLS) connection request with delegator server 101 over network 103. If the connection request fails, control returns to block 202. At block 204, delegator server 101 starts listening for client devices' connection requests on a specified port (e.g., 4433). Hence, at block 205, delegator server 101 receives the client device's connection request (a "hello" message or the like).

At block 206, delegator server 101 sends a default provisioning server certificate to the client device. If the certificate cannot be properly validated at block 207, control returns to block 202. Otherwise, at block 208, the client device sends its own digital certificate to delegator server 101. At block 209, delegator server 101 validates the device's certificate by a trusted Certificate Authority or CA (the entity that issues digital certificates). At block 210, delegator server 101 determines whether to allow or deny the TLS connection request, and responds to the client device. At block 211, if the TLS connection request has been allowed, control passes to block 212. Otherwise control returns to block 202.

At block 213, the client device issues a provisioning credential request (e.g., a Simple Object Access Protocol or SOAP request) to delegator server 101. At block 213, delegator server 101 looks up a corresponding customer delegate server (e.g., 106) by the client device's identification (e.g., MAC address, serial number, service tag, etc.). At block 214, delegator server 101 determines whether custom operation are allowed by the policy established for a respective customer, for example, as stored in database 102. If so, the customer's delegate server looks up a credential by service tag or the like, and discovers the new client device. At block 216, delegator server 101 replies to the client device's provisioning credentials request on the TLS connection.

At block 217, the client device sets the username and/or password received as part of the provisioning credentials request. If successful, a "zero-touch" or fully automatic device setup may proceed with the newly acquired provisioning credentials at block 218. Otherwise control returns to block 202.

In sum, after the client device determines the address of the provisioning service, it is ready to perform the handshake operation in the Auto-Discovery process. The client device makes a Web service call to the delegator over a secure connection. In some cases, by using TLS, it is possible for a delegator to authenticate the client device and vice versa. Following the successful TLS connection, a Web service call is made from the client device to a delegator where the input parameters provide a unique identity of the device (MAC, serial number, etc.) and optionally location information determined at startup (local IP address, domain, etc.). The output parameters, returned to the client device by the delegator, may be some combination of parameters provided by the delegator and the customer delegate (a client device's administrator's username and password credentials, for example). Only a small set of configuration is needed to bootstrap the provisioning process (for example, a temporary administrator username and password), and these so-called provisioning credentials are used for subsequent remote access and configuration via any suitable interface. The outcome of this handshake is that the delegator and the delegate learn that a device has been deployed and is ready for provisioning. Additionally, the device may be configured to authenticate subsequent provisioning requests. In some implementations, the delegator and the delegate may optionally check the devices identity against a pre-approved list of identities that are authorized to be provisioned.

Two certificates may be used for the mutually authenticated encrypted TLS connection between the client device and the delegator. The client device's handshake client encryption certificate may be signed with a certificate authority root certificate for which the public key is made available by the client device's manufacturer to delegator partners that incorporate an secure delegation service. The handshake client encryption certificate may be generated during the factory build of the server and is unique to every system. The default hostname (Common Name) embedded in the handshake client encryption certificate may be the unique identifier of the device. The manufacturer may provide a delegator certificate signed by the manufacturer's private key to delegator software partners. During the initial handshake connection, the client device may verify that the certificate provided by the delegator service is properly signed.

In this way a manufacturer may OEM a delegation service for the devices it manufactures. There may be multiple delegation services for a particular device and a customer may choose which delegation service is used for devices deployed in their own network(s). A given product or type of product may have multiple delegators, and each of those delegators may have multiple customer delegates.

In some embodiments, a manufacturer may provide a customer Web portal to its customers. Customers may register for a delegation service via the Web portal, and then all client devices purchased by that customer may be automatically associated with the customer's delegation service, for example, by service tag or MAC address. Several options could be provided to the customer for a delegation service.

For instance, in hosted callback scenario, there may be no customer delegate provisioning server and the customer may be provided access to set credentials to root and to send an email or other message to an administrator with the service tag and IP address of the machine that was provisioned (to make this process secure, the contents of the message may be could be signed by the delegator server). Additionally or alternatively, in a Secure Shell (SSH) callback scenario, a customer may provide a globally routable IP address, a SSH private key, and a command to execute. For example the delegator server may be configured to make this call "ssh delegate.customer.com -c getCred <SrvTag> <iDracIP>" and the output of the command may be Extensible Markup Language (XML) containing a temporary username and password to send to the server. The customer delegate may use this call as a trigger to provision the client device.

In some embodiments, a customer delegate may be automatically chosen for customers with a registered domain name without the need for a customer web portal. The manufacturer may choose a hostname (Example: "provisioning-delegate") and ask customers who want to have delegation to register a DNS entry for their delegate (Example: "provisioning-delegate.customer-domain.com"). All requests that come from devices with IP addresses associated with this domain via reverse DNS lookup may be associated with the delegate FQDN for that domain. Trust of the delegate by the delegator may be established by a mutually authenticated TLS connection, for example, and the customer's delegate may have a certificate signed by a suitable certificate authority where the CN of the certificate matches the FQDN domain delegate. The delegator server may make a SOAP call to the customer FQDN and authenticate it using the CA certificate. Likewise, the customer delegate may validate the certificate of the delegator server.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

Figure 3:
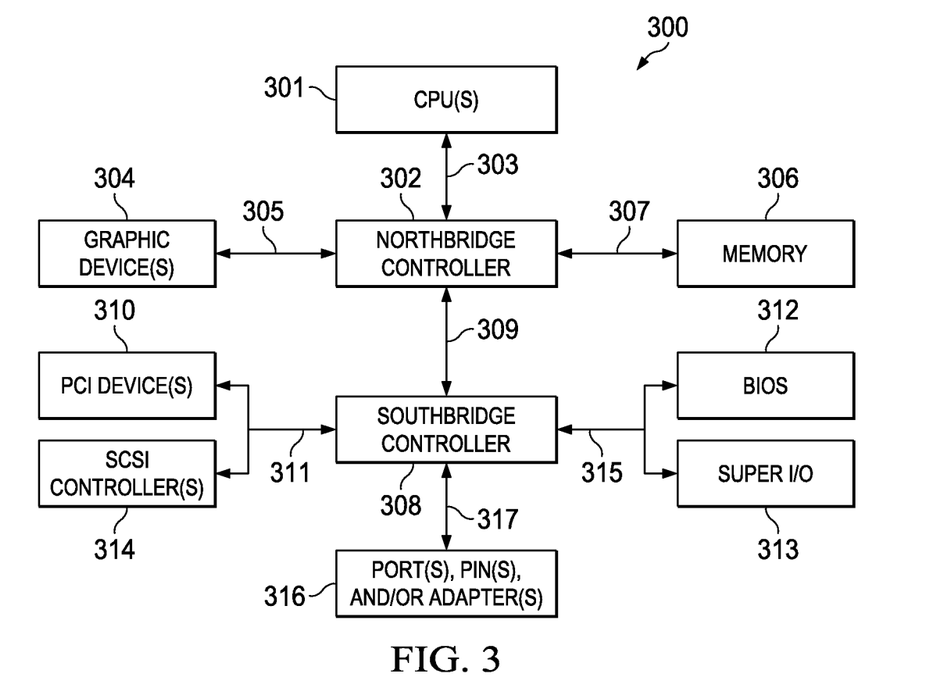
FIG. 3 is a block diagram of an example of an Information Handling System (IHS) according to some embodiments.

FIG. 3 is a block diagram of an example of an IHS. In some embodiments, IHS 300 may be used to implement any of computer systems or devices 101, 102A-N, and/or 105A-N. As shown, IHS 300 includes one or more CPUs 301. In various embodiments, IHS 300 may be a single-processor system including one CPU 301, or a multi-processor system including two or more CPUs 301 (e.g., two, four, eight, or any other suitable number). CPU(s) 301 may include any processor capable of executing program instructions. For example, in various embodiments, CPU(s) 301 may be general-purpose or embedded processors implementing any of a variety of Instruction Set Architectures (ISAs), such as the x86, POWERPC®, ARM®, SPARC®, or MIPS® ISAs, or any other suitable ISA. In multi-processor systems, each of CPU(s) 301 may commonly, but not necessarily, implement the same ISA.

CPU(s) 301 are coupled to northbridge controller or chipset 301 via front-side bus 303. Northbridge controller 302 may be configured to coordinate I/O traffic between CPU(s) 301 and other components. For example, in this particular implementation, northbridge controller 302 is coupled to graphics device(s) 304 (e.g., one or more video cards or adaptors) via graphics bus 305 (e.g., an Accelerated Graphics Port or AGP bus, a Peripheral Component Interconnect or PCI bus, or the like). Northbridge controller 302 is also coupled to system memory 306 via memory bus 307. Memory 306 may be configured to store program instructions and/or data accessible by CPU(s) 301. In various embodiments, memory 306 may be implemented using any suitable memory technology, such as static RAM (SRAM), synchronous dynamic RAM (SDRAM), nonvolatile/Flash-type memory, or any other type of memory.

Northbridge controller 302 is coupled to southbridge controller or chipset 308 via internal bus 309. Generally speaking, southbridge controller 308 may be configured to handle various of IHS 300's I/O operations, and it may provide interfaces such as, for instance, Universal Serial Bus (USB), audio, serial, parallel, Ethernet, or the like via port(s), pin(s), and/or adapter(s) 316 over bus 317. For example, southbridge controller 308 may be configured to allow data to be exchanged between IHS 300 and other devices, such as other IHSs attached to a network (e.g., network 104). In various embodiments, southbridge controller 308 may support communication via wired or wireless general data networks, such as any suitable type of Ethernet network, for example; via telecommunications/telephony networks such as analog voice networks or digital fiber communications networks; via storage area networks such as Fiber Channel SANs; or via any other suitable type of network and/or protocol.

Southbridge controller 308 may also enable connection to one or more keyboards, keypads, touch screens, scanning devices, voice or optical recognition devices, or any other devices suitable for entering or retrieving data. Multiple I/O devices may be present in IHS 300. In some embodiments, I/O devices may be separate from IHS 300 and may interact with IHS 300 through a wired or wireless connection. As shown, southbridge controller 308 is further coupled to one or more PCI devices 310 (e.g., modems, network cards, sound cards, or video cards) and to one or more SCSI controllers 314 via parallel bus 311. Southbridge controller 308 is also coupled to Basic I/O System (BIOS) 312 and to Super I/O Controller 313 via Low Pin Count (LPC) bus 315.

BIOS 312 includes non-volatile memory having program instructions stored thereon. Those instructions may be usable CPU(s) 301 to initialize and test other hardware components and/or to load an Operating System (OS) onto IHS 300. Super I/O Controller 313 combines interfaces for a variety of lower bandwidth or low data rate devices. Those devices may include, for example, floppy disks, parallel ports, keyboard and mouse, temperature sensor and fan speed monitoring/control, among others.

In some cases, IHS 300 may be configured to provide access to different types of computer-accessible media separate from memory 306. Generally speaking, a computer-accessible medium may include any tangible, non-transitory storage media or memory media such as electronic, magnetic, or optical media—e.g., magnetic disk, a hard drive, a CD/DVD-ROM, a Flash memory, etc. coupled to IHS 300 via northbridge controller 302 and/or southbridge controller 308.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

A person of ordinary skill in the art will appreciate that IHS 300 is merely illustrative and is not intended to limit the scope of the disclosure described herein. In particular, any computer system and/or device may include any combination of hardware or software capable of performing certain operations described herein. In addition, the operations performed by the illustrated components may, in some embodiments, be performed by fewer components or distributed across additional components. Similarly, in other embodiments, the operations of some of the illustrated components may not be performed and/or other additional operations may be available.

For example, in some implementations, northbridge controller 302 may be combined with southbridge controller 308, and/or be at least partially incorporated into CPU(s) 301. In other implementations, one or more of the devices or components shown in FIG. 3 may be absent, or one or more other components may be added. Accordingly, systems and methods described herein may be implemented or executed with other IHS configurations.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A delegator server, comprising:
    a processor; and
    a memory coupled to the processor, the memory including program instructions stored thereon that, upon execution by the processor, cause the delegator server to:
        receive, from a given client device via a secure connection, a request to obtain a provisioning credential, wherein the secure connection is established based upon a certificate stored in the given client device during manufacturing, wherein the given client device is one of a plurality of client devices provided by a vendor to a plurality of customer enterprises, wherein the delegator server is controlled by the vendor, wherein the delegator server is in communication with a plurality of delegate provisioning servers, and wherein each of the delegate provisioning servers is controlled by one of the plurality of customer enterprises;

identify a given one of the plurality of delegate provisioning servers that is associated with a given one of the plurality of customer enterprises to which the given client device has been provided;

retrieve the provisioning credential from the given delegate provisioning server; and provide the provisioning credential to the given client device, wherein the provisioning credential includes a username and password that enables the given client device to retrieve provisioning data from the given delegate provisioning server, and wherein the provisioning data prepares the given client device to be set up by the given customer enterprise.

2. The delegator server of claim 1, wherein the given client device is a smart phone, tablet, laptop, desktop, or server.

3. The delegator server of claim 1, wherein the certificate is inaccessible to the given customer enterprise.

4. The delegator server of claim 3, wherein the same certificate is stored in each of the plurality of client devices provided to the plurality of customer enterprises.

5. The delegator server of claim 4, wherein the given delegate provisioning server is identified based, at least in part, upon an identity of the given client device provided to the delegator service as part of the request.

6. The delegator server of claim 5, wherein the identity is represented by a service tag stored in the given client device during manufacturing.

7. The delegator server of claim 1, wherein the program instructions further cause the delegator server to, prior to receiving the request, receive a registration of the given client device from the given customer enterprise via a registration portal.

8. The delegator server of claim 1, wherein to identify the given delegate provisioning server associated with the given customer enterprise, the program instructions further cause the delegator server to identify a domain of the given customer enterprise based, at least in part, upon the request.

9. A method, comprising:

transmitting, by a given client device to a delegator server, a request to obtain a provisioning credential, wherein the given client device is one of a plurality of client devices provided by a vendor to a plurality of customer enterprises, wherein the delegator server is controlled by the vendor, wherein the delegator server is in communication with a plurality of delegate provisioning servers, wherein each of the delegate provisioning servers is controlled by a respective one of the plurality of customer enterprises, wherein the request is part of an activation procedure of the given client device within a given one of the plurality of customer enterprises after the given client device has been provided to the given customer enterprise, wherein transmitting includes establishing a secure connection with the delegator server based upon a certificate stored within the given client device during manufacturing, and wherein the same certificate is stored in each of the plurality of client devices provided to the plurality of customer enterprises;

receiving, at the client device from the delegator server, the provisioning credential, wherein the delegator server is configured to identify a given one of the plurality of delegate provisioning servers that is associated with the given customer enterprise and to retrieve the provisioning credential from the given delegate provisioning server; and using the provisioning credential, by the client device, to retrieve provisioning data from the given delegate provisioning server, wherein the provisioning data enables the given client device to be activated within the given customer enterprise.

10. The method of claim 9, wherein the provisioning credential includes a password.

11. The method of claim 9, wherein the delegator server if configured to identify the given customer enterprise based, at least in part, upon an identity of the given device submitted to the delegator server as part of the request.

12. A non-transitory computer-readable medium having program instructions stored thereon that, upon execution by a given delegate provisioning server, cause the given delegate provisioning server to:

receive an indication from a delegator server that a given client device has requested the delegator server for an activation service, wherein the given client device is one of a plurality of client devices provided by a vendor to a plurality of customer enterprises, wherein the delegator server is controlled by the vendor, wherein the delegator server is in communication with a plurality of delegate provisioning servers, wherein each of the delegate provisioning servers is controlled by a respective one of the plurality of customer enterprises, and wherein the delegator server is configured to identify the given delegate provisioning server among the plurality of delegate provisioning servers as being associated with a given one of the plurality of customer enterprises to which the given client device has been provided;

provide a provisioning credential to the delegator server, wherein the delegator server is configured to transmit the provisioning credential to the client device; and in response to receiving the provisioning credential from the given client device, provide provisioning data to the given client device, wherein the provisioning data prepares the given client device to be activated within the given customer enterprise, wherein the indication is received in response to the delegator server having established a secure connection with the given client device, the secure connection created based, at least in part, upon a certificate stored in the given client device during manufacturing, wherein the same certificate is stored in the plurality of client devices.

13. The non-transitory computer-readable medium of claim 12, wherein the delegator server is configured to identify the given delegate provisioning server based, at least in part, upon a service tag associated with the given client device, wherein the service tag is stored in the given client device upon manufacturing.

14. The non-transitory computer-readable medium of claim 13, wherein prior to the given client device having obtained the provisioning credential, the vendor receives a registration of the given client device as belonging to the given customer enterprise through a web portal.

\* \* \* \* \*